(12) United States Patent
Burant

(10) Patent No.: US 11,848,547 B1
(45) Date of Patent: Dec. 19, 2023

(54) CABLE PROTECTION SLEEVE

(71) Applicant: Richard Burant, Hartland, WI (US)

(72) Inventor: Richard Burant, Hartland, WI (US)

(*) Notice: Subject to any disclaimer, the term of this patent is extended or adjusted under 35 U.S.C. 154(b) by 0 days.

(21) Appl. No.: 17/826,925

(22) Filed: May 27, 2022

(51) Int. Cl.
*H02G 3/04* (2006.01)

(52) U.S. Cl.
CPC ......... *H02G 3/0481* (2013.01); *H02G 3/0406* (2013.01)

(58) Field of Classification Search
CPC .......................... H02G 3/0481; H02G 3/0406
USPC ........................................................... 174/92
See application file for complete search history.

(56) References Cited

U.S. PATENT DOCUMENTS

| | | | | |
|---|---|---|---|---|
| 3,161,906 A | * | 12/1964 | Yarm | H02G 3/0616 174/153 G |
| 3,206,539 A | * | 9/1965 | Kelly | H02G 3/0658 174/92 |
| 6,291,774 B1 | * | 9/2001 | Williams | H01B 17/00 174/138 R |
| 7,507,912 B1 | * | 3/2009 | Sempliner | H02G 3/22 174/152 G |
| 7,622,668 B1 | * | 11/2009 | Tollefson | H01B 17/00 49/58 |
| 9,365,170 B2 | * | 6/2016 | Gronowicz, Jr. | B60R 16/0222 |
| 10,125,900 B2 | * | 11/2018 | Penrod | F16L 5/10 |
| 2003/0079897 A1 | * | 5/2003 | Sempliner | H02G 3/185 174/650 |
| 2009/0302034 A1 | * | 12/2009 | Makela | H02G 3/088 174/152 G |
| 2012/0048616 A1 | * | 3/2012 | Breen, IV | H02G 3/22 174/651 |
| 2017/0203703 A1 | * | 7/2017 | Penrod | B60R 13/0846 |

FOREIGN PATENT DOCUMENTS

EP 1313192 A1 * 5/2003 ........... H02G 3/0406

* cited by examiner

*Primary Examiner* — Timothy J Thompson
*Assistant Examiner* — Michael F McAllister

(57) ABSTRACT

A device that protects cabling that protrudes from a conduit on a utility pole or light pole, deters pest intrusion into the utility pole, and can be installed without tools or without needing to remove cabling or disassemble the utility pole.

20 Claims, 2 Drawing Sheets

CABLE PROTECTION SLEEVE

CROSS REFERENCES TO RELATED APPLICATIONS

Not Applicable

STATEMENT REGARDING FEDERALLY SPONSORED RESEARCH OR DEVELOPMENT

Not Applicable

REFERENCE TO SEQUENCE LISTING, A TABLE, OR A COMPUTER PROGRAM LISTING COMPACT DISK APPENDIX

Not Applicable

FIELD OF THE PRESENT INVENTION

The present invention belongs to the field of lighting and, in that, relates generally to external cabling/wiring of outdoor utility poles or light poles. More specifically, the present invention relates, to the protection of cabling to telecom or other utility pole or light pole mounted equipment whereas cabling from inside the utility pole or light pole exits to provide power, communication or other cable or wiring needs to the equipment.

BACKGROUND OF THE PRESENT INVENTION

Telecommunication companies are constantly designing new and innovative communications and with that comes new equipment. With the emergence of LTE and 5G communications telecom companies are finding new ways to fill in the gaps in their network. One way they are filling this gap is by using new and existing light pole infrastructure to power smaller radio devices. Some of these new radio devices are mounted directly on utility or light poles. The equipment needs power and possibly other communication cabling which is typically run under ground and into the utility pole or light pole. The cabling exits the utility or light pole near the mounted equipment by utilizing a welded conduit on the utility or light pole structure. Typically made of steel these conduit pieces have rough edges that the cabling may move against from wind which causes wearing on the cabling. Eventually this cabling may be damaged and need to be replaced causing severe financial costs and downtime to the telecom network. The welded conduit also does not provide any protection from insects entering the utility or light pole and possibly causing damage to the internal wiring of the pole or causing a health hazard to the worker. Typically, insect intrusion is prevented using a waxy substance that fills in the gaps around the cabling, causing an unappealing view and making it hard to perform future work or upgrades to the utility or light pole or pole mounted equipment.

Objectives of the Present Invention

Principles of the present invention are directed towards attainment of certain objectives, being set forth as follows:
Primary objective of the present invention is to prevent wearing of the cabling infrastructure that protrudes from a utility or light pole by way of conduit pipe.

Yet another objective of the present invention is to provide a simple clean way to deter insect or other pests intruding to the inside of a utility or light pole.

A better understanding of how these and other objectives are achieved will be clear from the detailed description set forth below which relates to certain illustrative embodiments which specifically is indicative of the various ways in which the principles of the present invention may be employed.

BRIEF SUMMARY OF THE PRESENT INVENTION

In accordance with principles of the present invention, a Cable Protection Sleeve is proposed herein that allows for cabling of various sizes to protrude from the utility or light pole opening to be protected from wear which could occur from installation, wind or other cable movements while cables exit the utility or light pole housing structure. Split halves of the Cable Protection Sleeve are designed to be placed over previously installed various size cables and snaping together allowing for insertion of the assembled Cable Protection Sleeve into the utility or light pole cable entrance. Cable Protection Sleeve internal bristles naturally surround the various cable sizes to further protect the various cables from wear and provides protection from insect penetration into the utility or light pole via the cable hole entrance into the utility or light pole. An installed Cable Protection Sleeve provides a clean and professional look, eliminating the unsightly appearance of the waxy substance or sealant which has in the past been observed oozing down the outside of the utility or light pole.

BRIEF DESCRIPTION OF DRAWINGS

Reference is now made to the accompanying drawings, in which common indexing and numerals are used for purpose of reference across all drawings, in which.

Other details and features of the present invention will be apparent to the reader when the aforesaid drawings are considered in context of the detailed description to follow, as under.

DETAILED DESCRIPTION OF THE PRESENT INVENTION

General purpose of the present invention is to create a new solution for a problem that has been around for years. Accordingly, the present invention is directed to the construction of a cable protection sleeve capable of being deployed with no tools and minimal time to be installed. Technical, ergonomic, and commercial nuances, which will readily suggest from the description to follow, are intended to be covered by ambit of the present invention.

Figure 1:
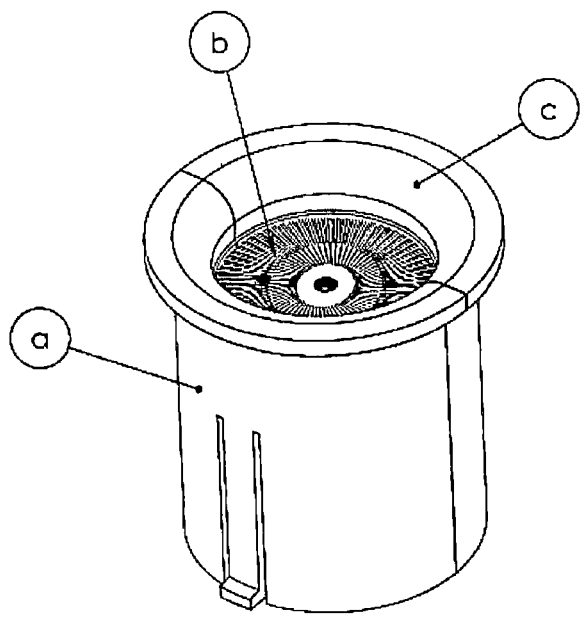
FIG. 1 is a 3D schematic depicting a proposed product in its assembled form.
Figure 2:
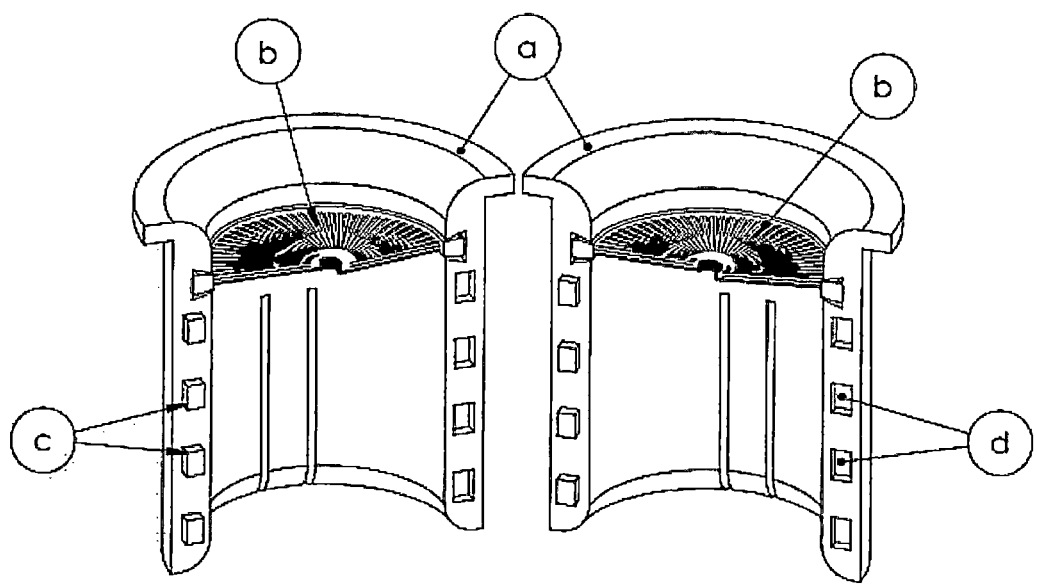
FIG. 2 is a 3D schematic depicting the proposed product disassembled in two halves.
Figure 3:
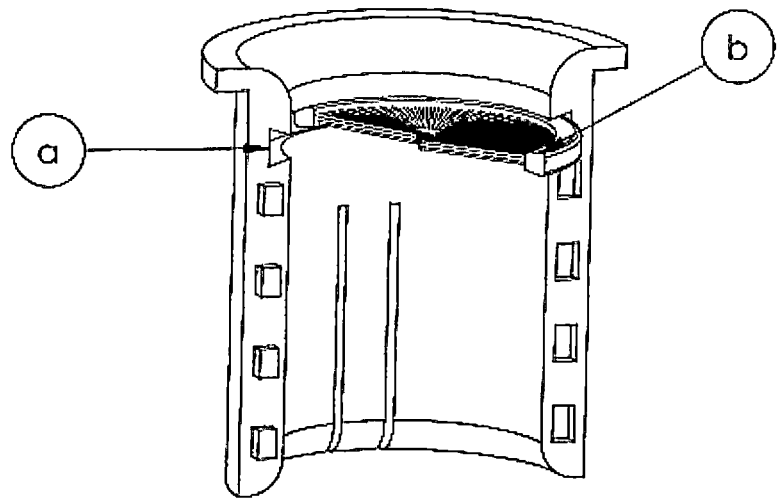
FIG. 3 is a 3D schematic depicting the channel that the brush/bristles slide and lock into.
Figure 4:
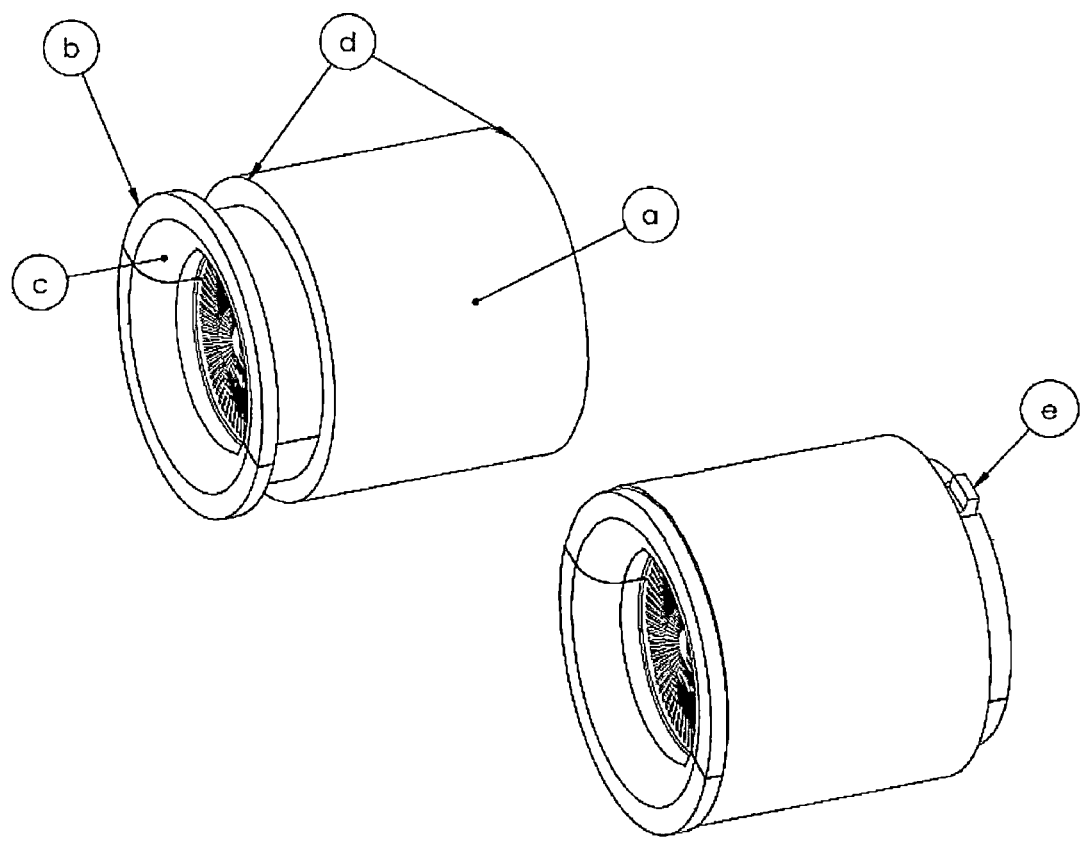
FIG. 4 is a 3D schematic depicting the proposed product in place inside a metal conduit.

Principally, the present inventor proposes a cylindrical design FIG. 1 split into two halves FIG. 2. The completed assembly FIG. 1 is held together by an interlocking design that includes a male interlock FIG. 2: c and a female interlock FIG. 2: d. These interlocks allow both halves of the cylinder to interlocked connecting the two halves together around cables. FIG. 3 shows the assembly of the bristles/brushes, also in halves FIG. 3: b, are designed to fit into a channel FIG. 3: a which allows them to lock in place without falling out of the product invention. The bristles/brushes deter pest intrusion. FIG. 4 shows the assembly of the device into the conduit. The upper left image shows the device as not fully inserted while the image on the right shows the fully in place device, noted by FIG. 4: e. The rounded edge FIG. 4: c is designed to seal and retain around the outlet/conduit FIG. 4: a that protrudes from the pole and allows the cabling to exit the pole in a secure fashion. This rounded edge FIG. 4: c is also designed to allow the cabling bend around its edge and prevent the cable from rubbing and wearing on the sharp edge FIG. 4: d of the outlet/conduit. Lastly, the product is designed with locking fingers FIG. 4: e that holds the product aligned and in place once fully installed.

Thus, there has been presented a cable protection sleeve having comprehensive integrated features in the manner and form described hereinabove. It is understood that the list given above, and phraseology and terminology used is for purpose of illustration and description. They are not intended to be exhaustive or to limit the present invention to precise form mentioned above and obviously many modifications and variations are possible in light of above elaborations without departing from spirit and scope of the present invention. Ambit of the present invention is restricted only by the appended claims.

I claim:

1. A cable protection device, the device comprising:
a cylindrical sleeve, wherein the cylindrical sleeve is split into two halves;
the two halves of the cylindrical sleeve comprising:
a male interlock;
a female interlock;
wherein an interlocking design allows the two halves interlocked by the male interlock and the female interlock together around a cable;
a channel in a top area of the cylindrical sleeve, wherein brush halves fit into the channel and locks the brush halves, wherein the brush halves naturally surround the cable to protect the cable;
a rounded edge, wherein the rounded edge seals around an outlet from a pole and allows the cable to exit the pole.

2. The cable protection device as claimed in claim 1, wherein the rounded edge retains around the outlet that protrudes from the pole.

3. The cable protection device as claimed in claim 1, wherein the rounded edge allows the cable to exit the pole in a secure fashion.

4. The cable protection device as claimed in claim 1, further comprising: the rounded edge allows the cable to bend around its edge and prevent the cable from rubbing on a sharp edge of the outlet.

5. The cable protection device as claimed in claim 1, further comprising: a locking finger on the cylindrical sleeve to align the device.

6. The cable protection device as claimed in claim 1, wherein the brush halves are designed to prevent entry of unwanted elements.

7. The cable protection device as claimed in claim 1, wherein the cable protection device can be installed without removing the cable.

8. The cable protection device as claimed in claim 1, wherein the cable protection device can be installed without disassembling the pole.

9. The cable protection device as claimed in claim 1, wherein the cylindrical sleeve fits cables of multiple sizes, wherein the brush halves naturally surround the cables of multiple sizes to protect the cables.

10. The cable protection device as claimed in claim 1, wherein the cylindrical sleeve fits multiple cables, wherein the brush halves naturally surround the multiple cables to protect the multiple cables.

11. A method for protecting a cable, the method comprising:
splitting a cylindrical sleeve is split into two halves, wherein the two halves of the cylindrical sleeve having a male interlock and a female interlock;
interlocking the two halves by the male interlock and the female interlock together around a cable;
fitting brush halves into a channel, in a top area of the cylindrical sleeve, and locking the brush halves, wherein the brush halves naturally surround the cable to protect the cable;
sealing, by a rounded edge, around an outlet from a pole and allowing the cable to exit the pole.

12. The method as claimed in claim 11, wherein the rounded edge retains around the outlet that protrudes from the pole.

13. The method as claimed in claim 11, wherein the rounded edge allows the cable to exit the pole in a secure fashion.

14. The method as claimed in claim 11, further comprising: allowing, by the rounded edge, the cable to bend around its edge and prevent the cable from rubbing on a sharp edge of the outlet.

15. The method as claimed in claim 11, further comprising: adding, a locking finger to the cylindrical sleeve that aligns the device.

16. The method as claimed in claim 11, wherein the brush halves are designed to prevent entry of unwanted elements.

17. The method as claimed in claim 11, wherein the cable protection device can be installed without removing the cable.

18. The method as claimed in claim 11, wherein the cable protection device can be installed without disassembling the pole.

19. The method as claimed in claim 11, wherein the cylindrical sleeve fits cables of multiple sizes, wherein the brush halves naturally surround the cables of multiple sizes to protect the cables.

20. The method as claimed in claim 11, wherein the cylindrical sleeve fits multiple cables, wherein the brush halves naturally surround the multiple cables to protect the multiple cables.

* * * * *